(12) United States Patent
Gornowicz (10) Patent No.: US 8,232,999 B2
(45) Date of Patent: Jul. 31, 2012

(54) FAST OCEANS AT NEAR INFINITE RESOLUTION

(75) Inventor: Galen Gerald Gornowicz, Sierra Madre, CA (US)

(73) Assignee: DreamWorks Animation LLC, Glendale, CA (US)

( * ) Notice: Subject to any disclaimer, the term of this patent is extended or adjusted under 35 U.S.C. 154(b) by 856 days.

(21) Appl. No.: 12/356,519

(22) Filed: Jan. 20, 2009

(65) Prior Publication Data

US 2009/0207176 A1     Aug. 20, 2009

Related U.S. Application Data

(60) Provisional application No. 61/022,796, filed on Jan. 22, 2008.

(51) Int. Cl.
*G06T 15/70*     (2006.01)
(52) U.S. Cl. ........................................ 345/474; 345/475
(58) Field of Classification Search ........................ None
See application file for complete search history.

(56) References Cited

U.S. PATENT DOCUMENTS 5,877,777 A     3/1999     Colwell

OTHER PUBLICATIONS

Deusen, O. et al. (2004). "The elements of nature: interactive and realistic techniques," *ACM SIGGRAPH 2004 Course Notes*, New York, NY, 32.
European Search Report and Written Opinion mailed Jul. 9, 2009, for EP Application No. 09250165 filed Jan. 22, 2009, 5 pages.
Fournier, A., and Reeves, W. T. (1986). "A simple model of ocean waves," *SIGGRAPH '86: Proceedings of the 13th annual conference on Computer graphics and interactive techniques*, ACM, New York, NY, 75-84.
Hinsinger, D., Neyret, F., and Cani, M.-P. (2002). "Interactive animation of ocean waves," *SCA '02: Proceedings of the 2002 ACM SIGGRAPH/Eurographics symposium on Computer animation*, ACM, New York, NY, 161-166.
Kass, M., and Miller, G. (1990). "Rapid, stable _uid dynamics for computer graphics," *SIGGRAPH '90: Proceedings of the 17th annual conference on Computer graphics and interactive techniques*, ACM, New York, NY, 49-57.

(Continued)

*Primary Examiner* — Kee M Tung
*Assistant Examiner* — Michelle Chin
(74) *Attorney, Agent, or Firm* — Morrison & Foerster LLP (57) ABSTRACT

The surface of a body of water can be animated by deconstructing a master wave model into several layer models and then reconstructing the layer models to form an optimized wave model. A wave model is obtained, which describes the wave surfaces in a body of water. The wave model is comprised of a range of wave model frequencies over a given area. A primary layer model, secondary and tertiary layer models are constructed based on portions of the wave model frequencies. An optimized wave model is constructed by combining the primary, secondary, and tertiary layer models. A wave surface point location is determined within the given area. A wave height value is computed for the wave surface point location using the optimized wave model. The wave height value that is associated with the surface point location is stored.

29 Claims, 9 Drawing Sheets

OTHER PUBLICATIONS

Mastin, G. A., Watterberg, P. A., and Mareda, J. F. (1987). "Fourier synthesis of ocean scenes," *IEEE Computer Graphic Applications* 7, 3, 16-23.

Mitchell, J. L. (Apr. 2005). "Real-Time Synthesis and Rendering of Ocean Water," *ATI Research Technical Report*, pp. 1-7.

Peachey, D. R. (1986). "Modeling waves and surf," *SIGGRAPH '86: Proceedings of the 13th annual conference on Computer graphics and interactive techniques*, ACM, New York, NY, 65-74.

Shi et al. (May 30, 2007). "Real-Time simulation of large-scale dynamic river water," *Simulation Modeling Practice and Theory* 15(6):635-646.

Tessendorf, J. (2004). "Simulating Ocean Water," *In Simulating Nature: Realistic and Interactive Techniques*, pp. 3.1-3.26.

Watt, A.H. (1992). *Advanced Animation and Rendering Techniques*. Addison-Wesley.

Yuksel, C. et al. (Jul. 2007). "Wave Particles," *SIGGRAPH '07: ACM SIGGRAPH 2007 papers*, ACM, New York, NY, 99.

FAST OCEANS AT NEAR INFINITE RESOLUTION

CROSS-REFERENCE TO RELATED APPLICATION

This application claims priority to U.S. Provisional Application Ser. No. 61/022,796 filed Jan. 22, 2008 which is incorporated herein by reference in its entirety for all purposes.

BACKGROUND

1. Field

This application relates generally to computer graphics and, more specifically, to using computer systems to simulate the surface of large bodies of water, such as an ocean.

2. Description of the Related Art

Computers and computer graphic systems are widely used to generate images of a three-dimensional scene as part of a computer-generated animation sequence. Within a three-dimensional scene, the computer graphics system may simulate natural phenomena, such as oceans or large bodies of water. One process of simulating such phenomena is to generate surface information, such as surface points in three-dimensional scene space. These surface points can be used to generate a mesh of polygons that define a three-dimensional surface model of a three-dimensional body or object. Known rendering techniques or light simulation algorithms may be applied to the surface model to produce a fully rendered image that appears realistic to the human eye.

When animating dynamic natural phenomena, the three-dimensional surface model may be computed over a multitude of time increments. An image may be generated at each time increment, such that a series of images may be sequentially displayed to create a computer animation sequence. The challenge lies in producing a set of surface points that is able to accurately simulate complex dynamic phenomena, such as waves on a large body of water. Preferably, a computer simulation is able to deliver accurate and realistic results without becoming a computational burden on the computer graphics system. Therefore, there is an interest in the art of computer animation to develop efficient processes of producing realistic simulations of dynamic natural phenomena.

Simulation of natural phenomena, such as the surface of a body of water, can be especially demanding on a computer graphics system. The simulation must be performed at a relatively high resolution to capture the complex shapes and surfaces that form individual waves and swells in a large body of water. Also, because bodies of water are constantly in motion, the simulation must be computed for a large number of animation frames to give the appearance of smooth fluid motion.

In the past, a variety of processes were used to address the problem of simulating water waves. Some known processes focus on modeling a dynamic wave surface using a wave front. These processes simulate the physics governing individual particle interaction as energy or a wave front is propagated through the medium. Yuksel, C., House, D. & Keyser, J., Wave Particles. ACM Trans. Graph. 26, 3, Article 99 (July 2007). These processes are well suited for representing certain types of waves, such as ripples or wakes created by an interaction of a water surface with floating or solid objects. However, this type of process may be inadequate when creating realistic simulations of large bodies of water in which wave surfaces are composed of a wide spectrum of wave frequencies.

Other processes are better suited for modeling the rich and full spectrum of frequencies that make up an ocean wave surface. For example, processes that use a Fourier spectral algorithm are able to reproduce the complex surfaces of a large body of water in a way that produces a realistic simulation. Tessendorf, Jerry et al., Simulating Ocean Water, ACM SIGGRAPH 2004 Course 31, The Elements of Nature: Interactive and Realistic Techniques, ACM, New York, N.Y., at 2-2. While these processes are capable of producing cinematic-quality results, they may be computationally expensive. In such Fourier processes, the speed of computation is directly affected by the bandwidth of the wave spectrum used to simulate the surface of the wave. For example, if the band of frequencies is narrow, then the surface may be computed quickly and efficiently, but the results may be visually undesirable. If a broad spectrum of ocean frequencies is simulated, then the visual effect may be satisfactory, but the simulation may consume too many computing resources to be practical for the computer graphics system. Thus, the computer animator must make a tradeoff between the resolution of the ocean model and the computer resources available for the animation sequence.

What is needed is a process of efficiently simulating waves in a large body of water capable of producing a rich and full spectrum of wave frequencies, while using a practical amount of computing resources.

SUMMARY

In an exemplary embodiment, the surface of a body of water is animated by deconstructing a master wave model into several layer models and then reconstructing the layer models to form an optimized wave model. A wave model is obtained, which describes the wave surfaces in a body of water. The wave model is comprised of a range of wave model frequencies over a given area. A primary layer model is defined that is comprised of a set of primary frequencies. The set of primary frequencies represents a portion of the range of wave frequencies described in the wave model. A secondary layer model is defined that is comprised of a set of secondary frequencies. The set of secondary frequencies includes wave frequencies greater than the set of primary frequencies. A tertiary layer model is defined that is comprised of a set of tertiary frequencies. The set of tertiary frequencies includes wave frequencies greater than the set of secondary frequencies. An optimized wave model is constructed by combining the primary, secondary, and tertiary layer models. A wave surface point location is determined within the given area. A wave height value is determined for the wave surface point location using the optimized wave model. The wave height value that is associated with the surface point location is stored.

The figures depict one embodiment of the present invention for purposes of illustration only. One skilled in the art will readily recognize from the following discussion that alternative embodiments of the structures and methods illustrated herein can be employed without departing from the principles of the invention described herein.

DETAILED DESCRIPTION

For purposes of simplicity, exemplary embodiments are described in the context of modeling the surface of a large body of water such as an ocean. However, the exemplary embodiments may be used to model any body of water or fluid. For purposes of generality, the terms "ocean" and "water" are used herein interchangeably and include any other fluid that has similar physical properties.

1. Simulation of Ocean Waves

Figure 1:
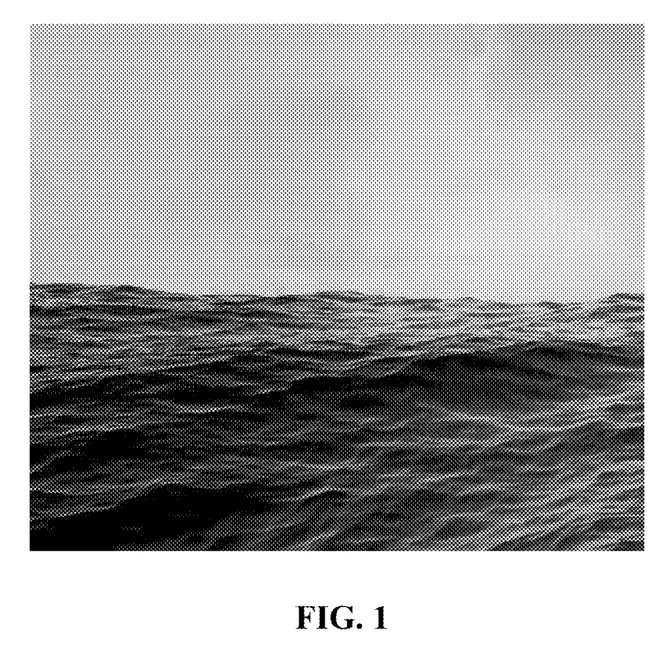
FIG. 1 illustrates a fully rendered simulation of an ocean surface.

Using a computer graphics system, the surface of a large body of water, such as an ocean, may be simulated in order to produce a realistic image in a computer animation sequence. FIG. 1 depicts an example of a fully rendered ocean wave surface that was produced using an exemplary embodiment of the surface simulation techniques described herein.

The surface of large bodies of water, such as an ocean, can be described as being composed of a combination of individual wave patterns spanning a spectrum of wave frequencies. Periodic functions representing these wave patterns can be used to predict or simulate the surface of the ocean at various points in time in order to simulate realistic fluid motion.

Figure 2:
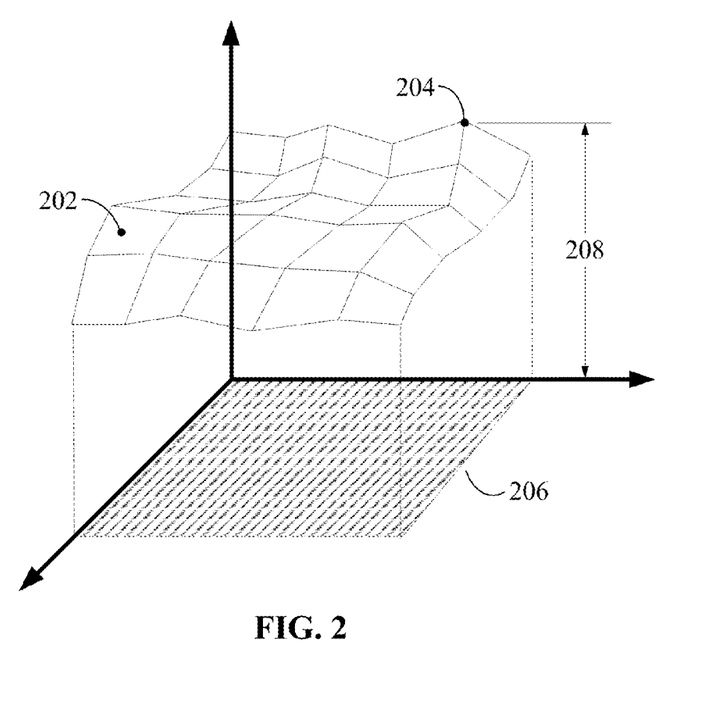
FIG. 2 illustrates a three-dimensional wireframe model of a wave surface over a given area.

A digital representation of a water surface may be composed of a large number of surface points defined in a three-dimensional scene space. The position of these points may be governed by a mathematical function or set of mathematical functions that simulate the complex dynamics of wave motion over time. FIG. 2 depicts a wireframe model 202 of a set of surface points 204 over a given area 206. Each surface point 204 has a location within the given area 206 and a wave height value 208. In some embodiments, the set of surface points 204 over the given area 206 are referred to as a wave height field. These points can be used in combination with other computer graphics systems, such as polygon generators and light-shading engines, to produce a final rendered digital image. Alan H. Watt, Advanced Animation and Rendering Techniques (Addison-Wesley, 1992).

A dynamic water simulation model can be used to generate the surface of a body of water over a series of time increments. Using a computer graphics system, each surface model can be rendered to produce a series of images in order to form an animation sequence. The embodiment described herein relates to the efficient simulation of an ocean surface by generating surface points using multiple layer models.

2. FFT Representation of a Wave Surface

As mentioned above, the wireframe model 202 comprised of surface points 204, represents the surface of a body of water. As shown in Equation 1, the height 208 (h) of these surface points may be defined as a function of a two-dimensional location (x) over a given area and time (t):

$$h = h(x,t). \quad \text{(Equation 1)}$$

The function h(x,t) may include a combination of multiple periodic functions (i.e., sine and cosine) defined over the given area. These periodic functions may be selected based on empirical models of actual waves in order to create a realistic approximation of the surface of a body of water over time. For example, using known methods of spectral analysis, a Fast Fourier Transform (FFT) may be applied to an empirical model of actual waves. Using an FFT, the surface of the measured wave may deconstruct the simulation into a series of periodic functions (H) defined over a frequency domain (k):

$$H = H(k). \quad \text{(Equation 2)}$$

Alternatively, in a preferred embodiment, the combination of periodic functions may be derived from randomly distributed Gaussian noise. Using this process, a two-dimensional Gaussian noise pattern may be non-directionally filtered to create a spectrum of sine and cosine waves that approximate the results of the empirical model above. Such techniques are described in references, such as Tessendorf, which apply what is referred to as the Phillips spectrum to a Gaussian noise pattern. Tessendorf, Jerry et al., Simulating Ocean Water, ACM SIGGRAPH 2004 Course 31, The Elements of Nature: Interactive and Realistic Techniques, ACM, New York, N.Y., at 2-2. Additionally, the pattern may be directionally filtered to pass waves that are aligned with a wind vector and to attenuate waves that would be traveling orthogonal to the wind.

The result of a filtered Gaussian noise pattern is a simulation of the water wave surface over time as a function of frequency (k) defined as H(k). Mathematically, H(k) may be composed of several sinusoids with complex, time-dependent amplitudes. Because H(k) is defined over a frequency domain, the height field h(x,t) can be computed by performing either an inverse discrete Fourier transform (DFT) or an inverse fast Fourier transform (FFT) described as:

$$h(x,t) = \frac{1}{N}\sum_{n=0}^{N-1} H_n e^{-2\pi i k n / N}, \quad \text{(Equation 3)}$$

where 0 to N−1 is referred to as the wavenumber range. The wavenumber range represents the number of points in which an inverse FFT is performed on the function H(k). The wavenumber range is also referred to as the resolution of the inverse FFT. Thus, the inverse FFT, described in Equation 3, can be used to transform the function H(k) into a spatial domain function. The spatial domain function h(x,t) can be used to determine the wave height field for the surface of the ocean or body of water.

Note, if the availability of computing resources were not a concern, the entire wave height field could be computed using an inverse FFT of H(k) at a resolution (N). However, in order to produce images of cinematographic-quality, relatively high resolution numbers (N) must be used. For example, an inverse FFT may be computed at a resolution of 2048 or higher to produce cinematographic quality images. However, at these high resolutions, a typical inverse FFT computation would take an unacceptable amount of resources using a typical computer animation system.

While it may not be practical to compute an inverse FFT at high resolutions, the function H(k) may be used as a "master wave model" in a process of simulating the surface of a body of water using multiple layers. This master wave model serves as a reference for the set of frequencies that define the dynamics of the surface motion. Additionally, the master wave model may contain wave model parameters, such as wave speed and wave height, which give the wave model simulation its characteristic features. The following embodiment describes a process of determining the wave height field of a master wave model at high resolutions in a computationally efficient manner.

3. Procedure Summary

Given a master wave model H(k), an optimized wave model can be constructed that uses a fraction of the computing resources without sacrificing apparent resolution or simulation quality.

Figure 3:
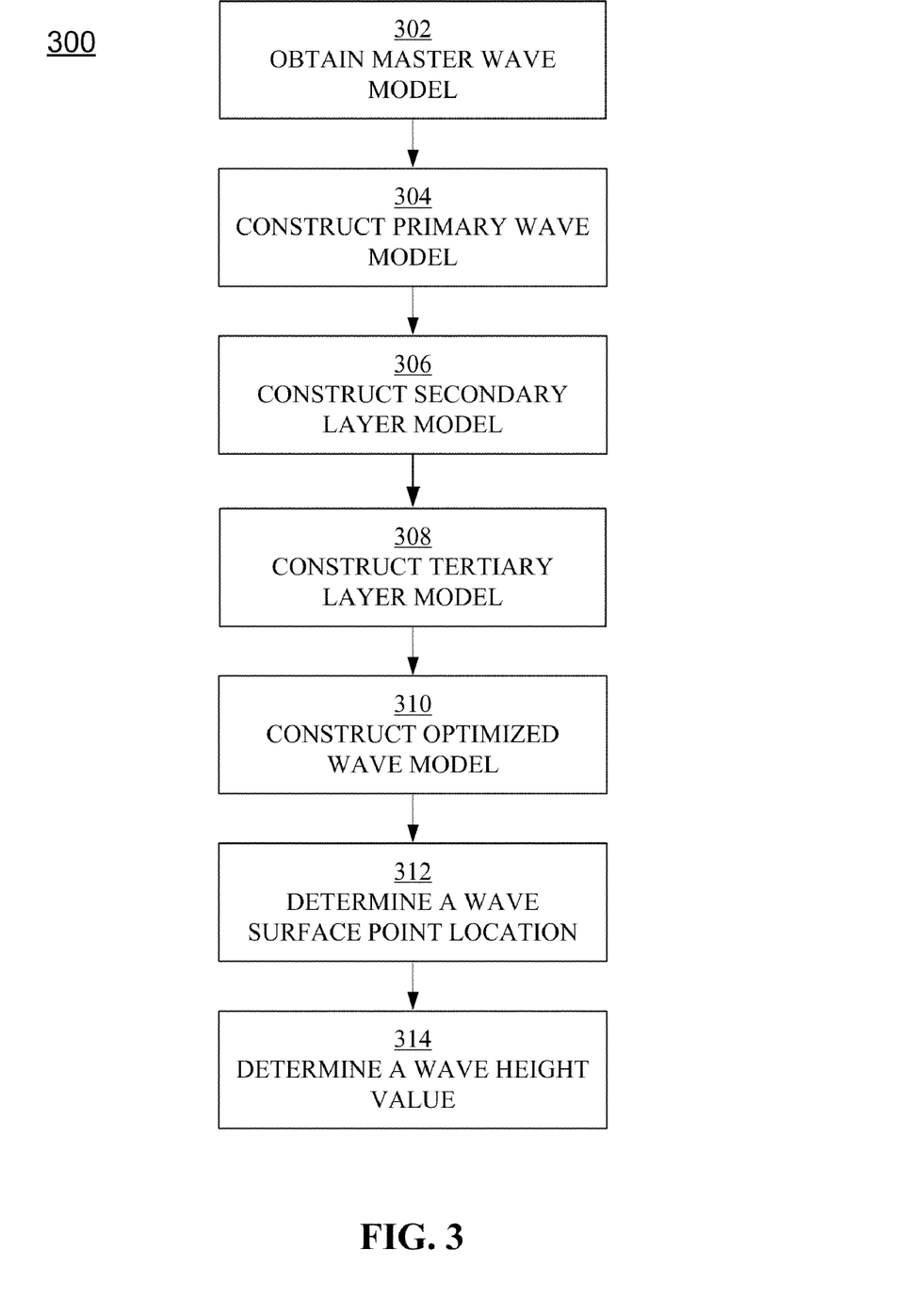
FIG. 3 illustrates a process of using multiple layer models to compute a wave height value for a wave surface point.

An embodiment of the procedure can be summarized as a deconstruction of the master wave model into several layer models and then a reconstruction of the layer models to form an optimized wave model. FIG. 3 depicts a flow chart outline of an exemplary procedure 300 for constructing an optimized wave model and determining a wave height value.

In step 302, a master wave model is obtained. The master wave model is comprised of a range of wave model frequencies that may be computed over a wavenumber range 0 to N−1. The master wave model is defined over a given wave area 206 (FIG. 2).

In step 304, the master wave model can be used to construct a primary layer model. The primary layer model represents a set of primary frequencies defined as a sub-set of the entire wavenumber range. In some embodiments, the primary frequencies represented by the primary layer model are the lower frequencies of the entire wavenumber range.

In step 306, the master wave model may be used to construct a secondary layer model. The secondary layer model represents a set of secondary frequencies defined as another sub-set of the entire wavenumber range. In some embodiments, the secondary frequencies represented by the secondary layer model are frequencies that are generally higher than the primary frequencies.

In step 308, the master wave model may be used to construct a tertiary layer model. The tertiary layer model represents a set of tertiary frequencies defined as yet another sub-set of the entire wavenumber range. In some embodiments, the tertiary frequencies represented by the tertiary layer model are frequencies that are generally higher than the secondary frequencies.

In some embodiments, the secondary and tertiary layer models are also referred to as subsequent layer models. Thus, in some embodiments, the master wave model may be broken into three or more subsequent layer models, each representing a sub-set of the entire wavenumber range 0 to N−1.

As noted above, the primary layer model typically represents lower frequencies. As a result, the primary layer model typically corresponds to larger waves of the master wave model. Likewise, subsequent layer models such as the secondary layer model and the tertiary layer model represent higher frequencies. Thus, these subsequent layer models typically correspond to the smaller surface waves in the master wave model.

In step 310, the primary layer model, secondary layer model, tertiary layer model, and any additional subsequent layer models are used to construct an optimized wave model. The optimized wave model may define the surface of the simulated wave over an area.

In step 312, a wave surface point location is determined within the given area. In some embodiments, the wave surface point location is a two-dimensional position coordinate of the wave surface point within the given area.

In step 314, the optimized wave model is used to compute a wave surface height given a wave surface point location. In some embodiments, the wave surface height and the wave surface point location are used to define a wave surface point.

Typically, the wave surface point is one of a large group of other wave surface points that can be used to construct a wave height field. Steps 312 and 314 are repeated using additional wave surface point locations to compute additional wave surface height values. These additional point locations and wave height values may correspond to a wave height field over an area the same as or less than the given area. Additionally, the wave surface point locations and wave height values may be stored in an array of values or as part of a data structure.

Figure 4:
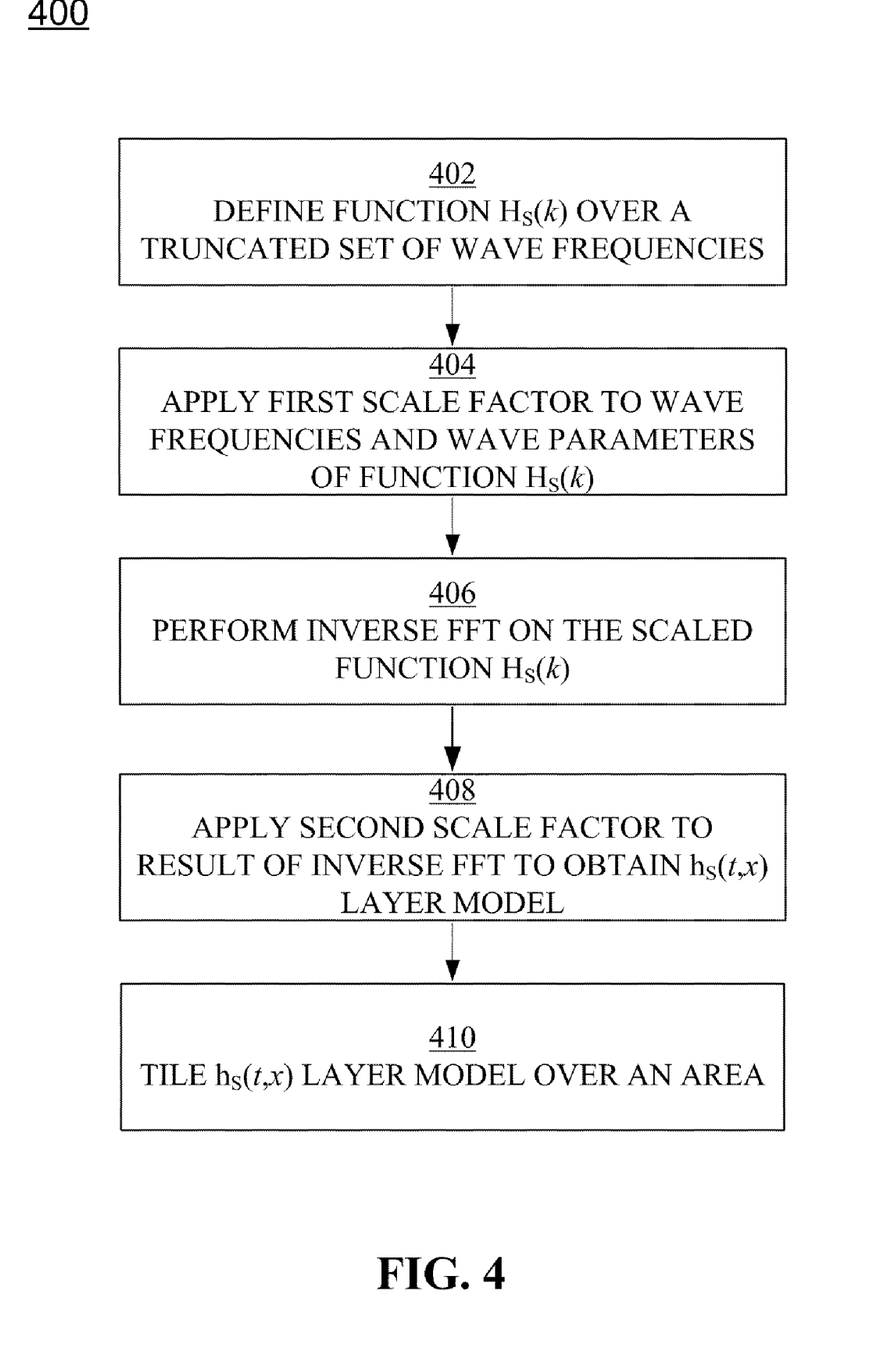
FIG. 4 illustrates a process of constructing a subsequent, high-frequency layer model.

Typically, the inverse FFT transformation consumes a significant portion of the computing resources allocated to an ocean simulation. Thus, significant computational gains can be made by reducing the size of the inverse FFT transformations performed on the subsequent layer models. FIG. 4 depicts a flow chart outline of an exemplary process 400 for constructing a subsequent, high-frequency layer model by applying an inverse FFT transformation in a more efficient manner.

In step 402, a function $H_S(k)$ is defined to represent a truncated portion of the master wave frequencies. For example, the function $H_S(k)$ may correspond to a set of frequencies that are a sub-set of the entire wavenumber range 0 through N−1.

In step 404, a first scale factor is applied to the function $H_S(k)$. Typically, a scale factor of 2 is applied to the function $H_S(k)$. However, the process is not limited to one particular scale factor and a different scale factor may be applied depending on the subsequent layer being constructed. In some embodiments, the portions of the wave master parameters are also scaled in order to preserve visual characteristics of the wave.

In step 406, an inverse FFT is performed on the scaled function $H_S(k)$. In some embodiments, an inverse FFT is computed for every other wavenumber value over the range of frequencies associated with the scaled function $H_S(k)$. For example, the inverse FFT may be computed using only the integer wavenumber values. In some embodiments when the first scale factor is 2, odd wavenumber values will become non-integer values and will not be used when computing the inverse FFT of the function $H_S(k)$. In other embodiments, an inverse FFT may be computed on data in which only every $2^x$ wavenumber is present (e.g., every 2, 4, 8, etc. wavenumbers).

In step 408, a second scale factor is applied to the results of the inverse FFT to obtain the subsequent layer model $h_S(x,t)$. In some embodiments, the second scale factor is the inverse of the first scale factor applied in step 404. The overall effect of applying the second scale factor is to recover the original frequencies represented by $H_S(k)$ before the first scale factor was applied in step 404.

As a result of steps 402 through 408, the function $H_S(k)$ is converted into a function $h_S(x,t)$ in the spatial domain. The new spatial domain function $h_S(x,t)$ represents the same high-frequency waves represented by the frequency domain function $H_S(k)$. However, as a result of steps 402 through 408, the function $h_S(x,t)$ corresponds to an area that may be smaller than the original given area (206). Thus, in step 410, the subsequent layer model may be tiled end-to-end to compensate for the reduction in effective area.

In some embodiments, steps 402 through 410 may be repeated to construct additional subsequent layer models. All of the subsequent layer models and a primary layer model may then be combined to form an optimized wave model.

The resulting optimized wave model can be used to construct a full-spectrum ocean simulation with the same level of visual detail available using a full-spectrum inverse FFT of the master wave model $H_S(k)$. In a preferred embodiment, the lower-frequency components, which correspond to larger wave patterns, are not tiled. However, higher-frequency components, which correspond to smaller waves, may be tiled several times over the given area. If the tiling of smaller wave patterns is combined with larger un-tiled wave patterns, then the repetition of higher frequency patterns is virtually undetectable by the human eye. As a result, some embodiments of the optimized wave model allow a user to construct a full-spectrum ocean simulation at impressive resolutions without significantly increasing the burden on the computer resources.

4. Using a Master Ocean Model to Construct Layer Models

In some embodiments, the number of layers used depends on the computing resources available to perform the ocean simulation. For example, a user may select a desired or apparent resolution defined as $R_a$. The user may also select the computational resolution that is feasible given the computing resources available defined as $R_c$. If the values of $R_a$ and $R_c$ are expressed in powers of two, the number of layers required (L) can be described as:

$$L = R_a - R_c. \quad \text{(Equation 4)}$$

For example, if a desired or apparent resolution of 2048× 2048 or $2^{11} \times 2^{11}$ is selected, then the apparent resolution of $R_a$ would be 11. Similarly, if the computing resources can only handle an actual resolution of 128×128 or $2^7 \times 2^7$, the computational resolution or $R_c$ would be 7. Using Equation 4, the number of layers required (L) would be $R_a - R_c$, or 11–7, which is 4. Thus, in this exemplary embodiment, a minimum of four (4) layers would be required to simulate the full spectrum of the ocean without significantly impairing resolution quality.

Figure 5A:
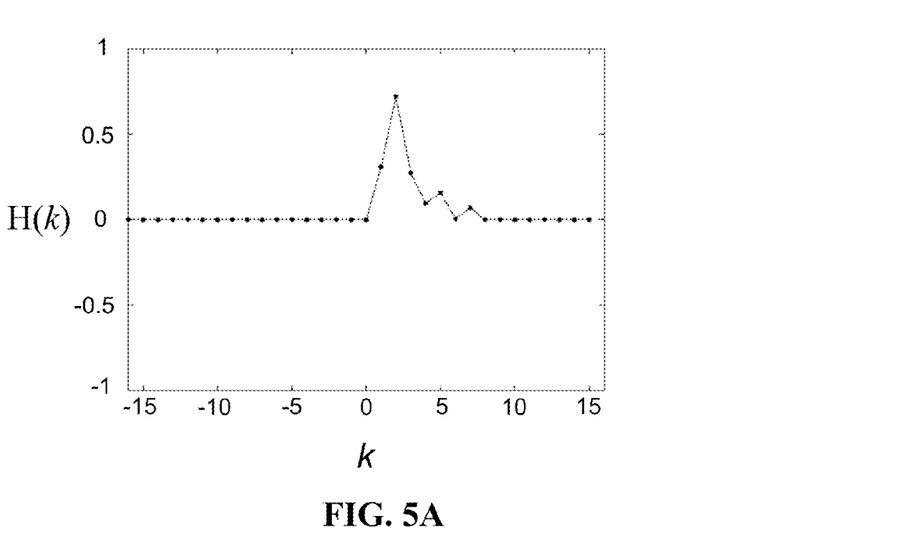
FIG. 5A illustrates a two-dimensional representation of a full wave model H(k) in a frequency domain.

FIG. 5A depicts a two-dimensional plot of an exemplary master wave model H(k) over a frequency domain (k). Because H(k) is a spectral representation of the wave model, each peak along H(k) represents a dominant wave pattern in the master wave model. An inverse FFT can be applied to the function H(k) to produce a spatial domain representation of the function. For example, an inverse FFT could be applied to the function H(k) at a resolution of N wavenumbers over the range of frequencies (k).

Figure 5B:
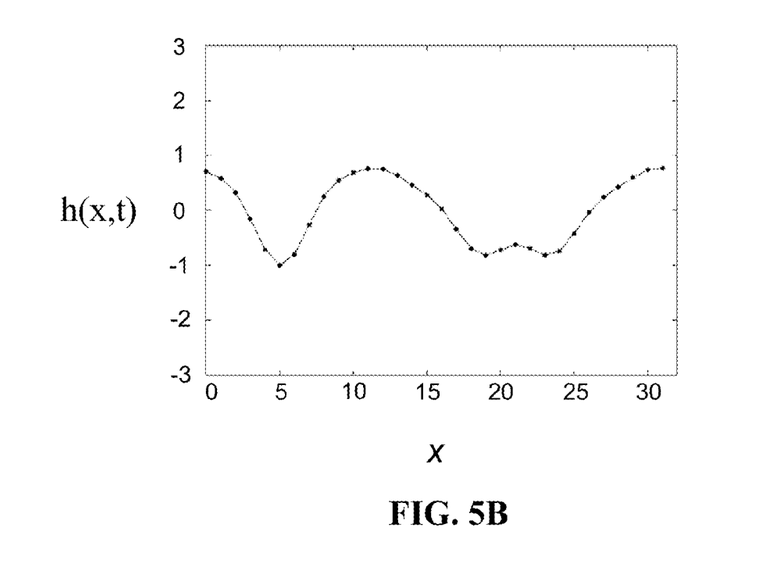
FIG. 5B illustrates a two-dimensional representation of a full wave model h(x,t) in a spatial domain.

FIG. 5B depicts a two-dimensional plot of the result of an inverse FFT on H(k). The inverse FFT produces a spatial domain representation of the master wave model H(k) as the function h(x,t). The two-dimensional plot in FIG. 5B represents the surface of a wave evaluated over a set of points (x).

As an illustrative example, the function h(x,t) is drawn over a single position variable (x). However, h(x,t) is typically defined over two position variables, such as position coordinates y and z. Thus, when h(x,t) is evaluated over an entire given area 206 (FIG. 2), the result may be a set of points represented by three-dimensional coordinates y, z, and h. The collection of points, also known as a wave height field, may be used to define a wireframe model 202 as shown in FIG. 2. Because h(x,t) is also a function of time (t), the motion of the wave surface may be simulated by evaluating h(x,t) over a series of sequential time increments.

Figure 6:
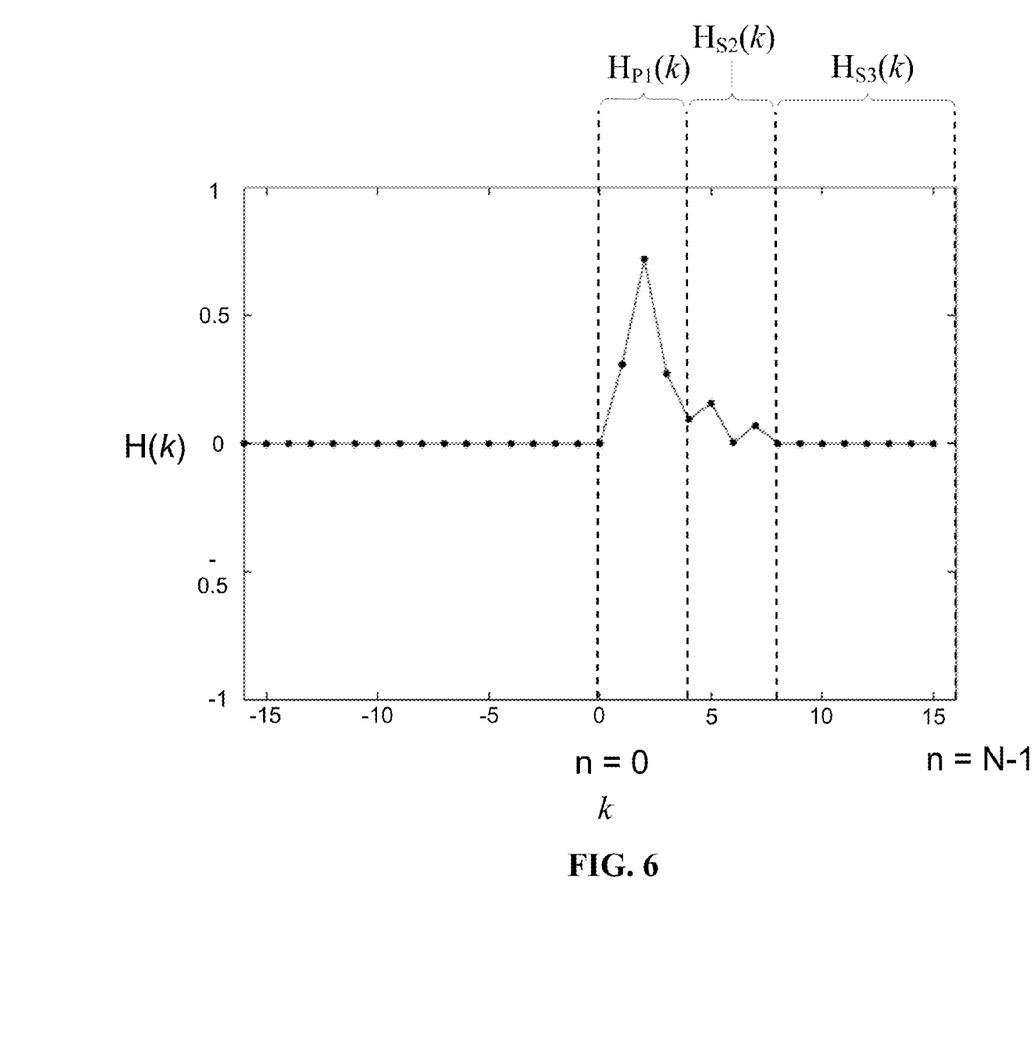
FIG. 6 illustrates a full wave model H(k) divided into three partial functions.

FIG. 6 depicts the function H(k) over a frequency domain (k). H(k) may be evaluated for the entire range of frequencies by performing an inverse FFT at a resolution of N wavenumber points. For example, the inverse FFT may be written as a sum of inverse Fourier transformations at points n=0 to n=N−1 as:

$$h(x, t) = \frac{1}{N} \sum_{n=0}^{N-1} H_n e^{-2\pi i k n / N}. \quad \text{(Equation 5)}$$

As discussed previously, a realistic simulation of a large body of water requires relatively large resolution values N. A full inverse FFT using a high resolution N is computationally expensive and may be impractical given typical hardware constraints. Instead, the master wave model function H(k) may be broken up into smaller sets of frequencies.

FIG. 6 depicts an illustrative example of how the function H(k) defined over N wavenumbers can be broken into separate functions in the frequency domain. The size of each partition may be selected such that the size of subsequent layers increases as a power of two. For example, the resolution N may be expressed as R powers of two such that:

$$N = 2^R \quad \text{(Equation 6)}$$

For a given resolution N, each partition size may be expressed in terms of the exponent value R so that the size of each subsequent layer doubles. For example, the function H(k) is divided into three partitions, as shown in FIG. 6. A set of primary frequencies may be defined such that $H_{P1}(k)$ represents frequencies banded by values of n=0 through $n = 2^{(R-2)} - 1$. A secondary set of subsequent frequencies may be defined such that $H_{S2}(k)$ represents frequencies banded by $n = 2^{(R-2)}$ through $n = 2^{(R-1)} - 1$. Similarly, a tertiary set of subsequent frequencies may be defined such that and $H_{S3}(k)$ represents frequencies banded by $n = 2^{(R-1)}$ through $n = 2^R - 1$.

Note that the partition of H(k) as described above is only an illustrative example of a partition process. In some embodiments, the number of partitions may equal four or more. Additionally, in some embodiments, the partitions do not need to be a particular size nor do the partitions need to be defined to compose the entire range of H(k). For example, the partitions could have gaps of frequencies not represented by any of the partial functions. Also, the partial functions could be defined so that their frequency ranges overlap. The partition size and span may be selected to best approximate a given wave model based on its individual characteristics.

A property of the Fourier transformation is that an inverse FFT of an entire function can also be represented as a sum of the inverse FFT of individual portions of the entire function. Thus, defining an inverse FFT over n points ranging from 0 to N−1, h(x,t) may be written as:

$$h(x, t) = \frac{1}{N} \sum_{n=0}^{2^{(R-2)}-1} H_n e^{-2\pi i k n / N} + \frac{1}{N} \sum_{n=2^{(R-2)}}^{2^{(R-1)}-1} H_n e^{-2\pi i k n / N} + \frac{1}{N} \sum_{n=2^{(R-1)}}^{2^R - 1} H_n e^{-2\pi i k n / N}, \quad \text{(Equation 7)}$$

where $N = 2^R$. Thus, in some embodiments, the master wave model function may be deconstructed into several partial functions, where each partial function is defined over a smaller span of frequencies. These partial functions are then used to define the separate wave layer models described herein.

5. Primary Layer Construction

Figure 7A:
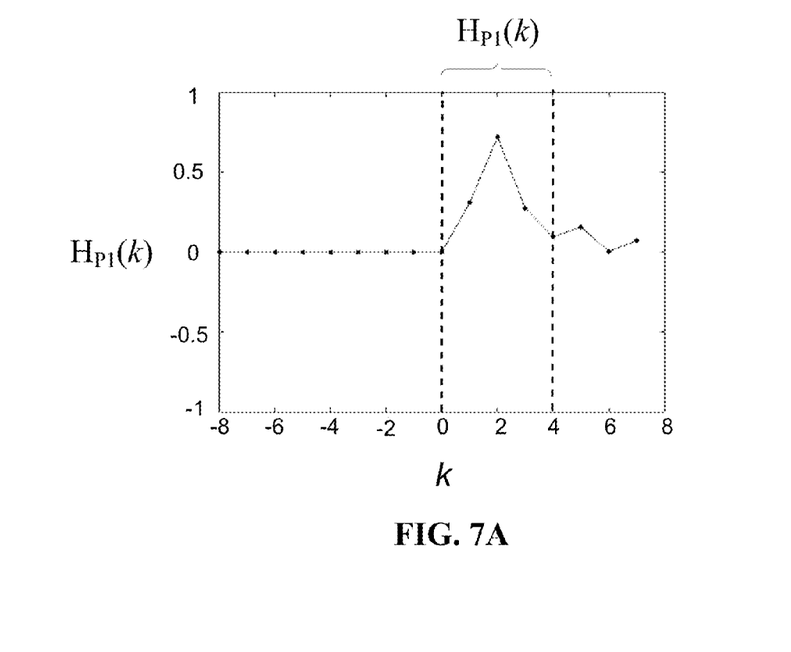
FIG. 7A illustrates a two-dimensional representation of a portion of a wave model $H_{P1}(k)$ in a frequency domain.

In some embodiments, lower frequency waves in the master wave model can be represented using a primary layer model. A primary layer model may be constructed using the lower frequencies of the master wave frequency set. An exemplary embodiment shown in FIG. 7A depicts a frequency range bounded by n=0 through n=$2^{(R-2)}$−1, also referred to as $H_{P1}(k)$.

By bounding the frequency range, the master wave model is truncated, which essentially discards the higher frequencies in the spectrum. FIG. 7A depicts this truncated portion of the master wave model $H_{P1}(k)$.

In some embodiments, a primary layer model $h_{P1}(x,t)$ may be constructed by performing an inverse FFT on $H_{P1}(k)$:

$$h_{P1}(x, t) = \frac{1}{N} \sum_{n=0}^{2^{(R-2)}-1} H_{P1n} e^{-2\pi i k n/N}. \qquad \text{(Equation 8)}$$

Truncating the frequency set results in a significant computational savings, as the inverse FFT is only performed over a portion of the total resolution (N). In this example, the inverse FFT is only performed on a data set that is ¼×¼, or 1⁄16 the size resulting in a significant computational savings.

Figure 7B:
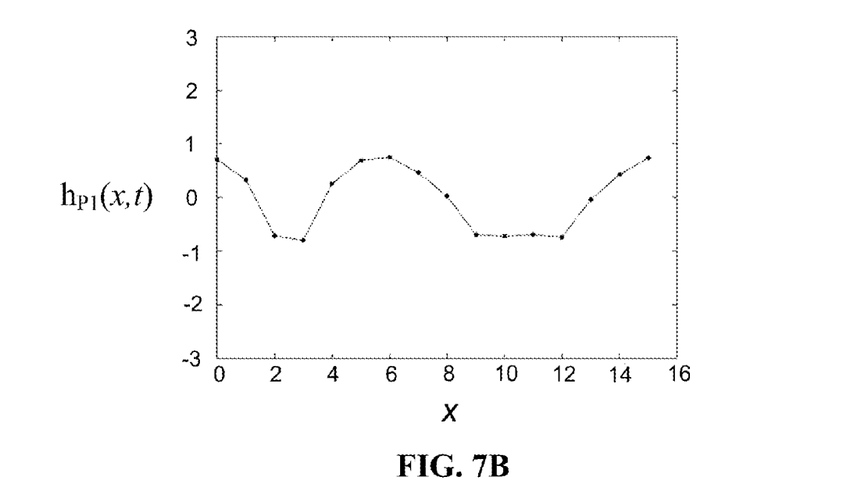
FIG. 7B illustrates a two-dimensional representation of a portion of a wave model $h_{P1}(x,t)$ in a spatial domain.

The result is a primary layer model $h_{P1}(x,t)$, which represents the lower frequency waves in a spatial domain as illustrated in FIG. 7B. Note, the primary layer model, $h_{P1}(x,t)$ in FIG. 7B appears to be smoothed out when compared to the full spectrum model h(x,t) shown in FIG. 5B. This is due to the truncation or disposal of higher-frequency components, which appear as smaller waves on the face of the larger, lower-frequency waves. If an ocean simulation were to be constructed using only the lower-frequency components in the primary layer model, the ocean would appear to contain only large, smooth swells and rolling waves. Much of the rich detail provided by smaller waves and ripples on the surface would be lost. Therefore, an optimized wave model must add back the detail removed in the creation of the primary layer model. To remain computationally efficient, this detail must be added without significantly increasing the size of the inverse FFT transformations required.

6. Subsequent Layer Construction

In some embodiments, the rich detail of the original model can be simulated by constructing layer model components that represent the higher-frequency portion of the master wave model. In some embodiments, a secondary layer model may be constructed using a portion of the master wave frequency set, such as the higher-frequency values, that was discarded in the construction of the earlier primary layer model.

Figure 8A:
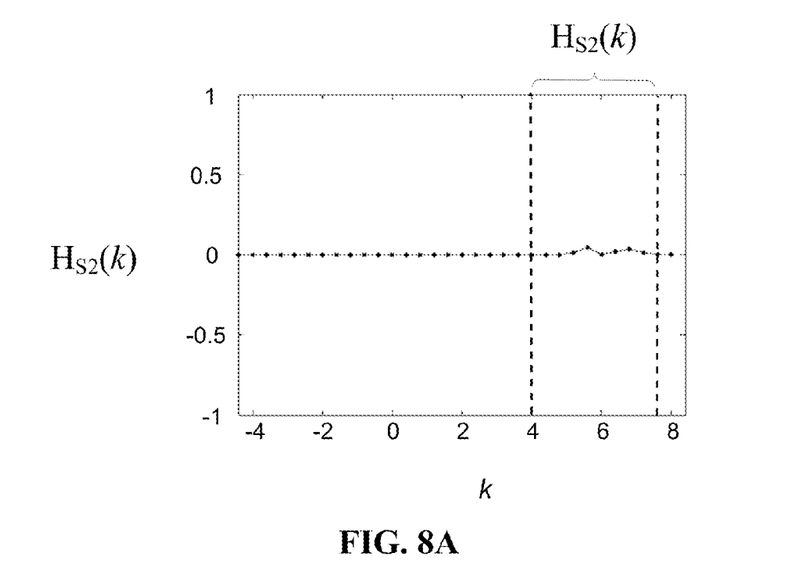
FIG. 8A illustrates a two-dimensional representation of a portion of a wave model $H_{S2}(k)$ in a frequency domain.
Figure 8B:
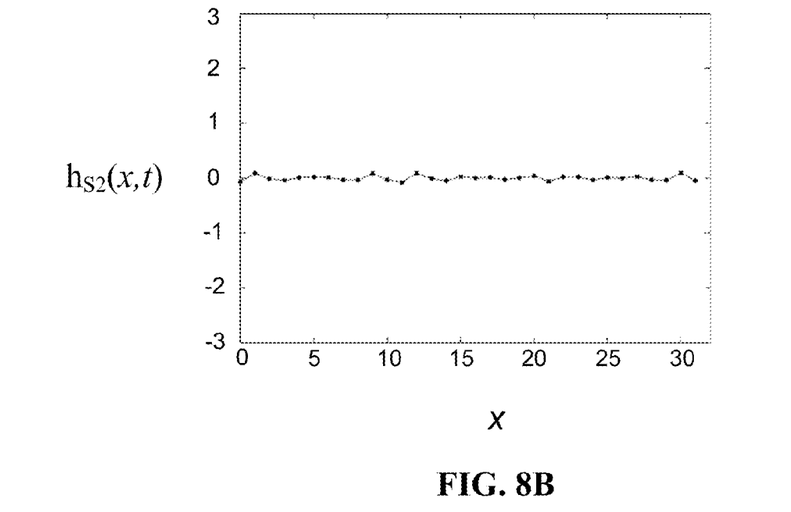
FIG. 8B illustrates a two-dimensional representation of a portion of a wave model $h_{S2}(x,t)$ in a spatial domain.

In an exemplary embodiment, a range of wavenumbers may be defined such that the lower frequencies of the primary layer model are excluded, as well as higher frequencies that may be contained in another, subsequent layer model. An exemplary embodiment shown in FIG. 8A depicts a frequency range bounded by values of n ranging from n=$2^{(R-2)}$ through n=$2^{(R-1)}$−1, also referred to as function $H_{S2}(k)$. FIG. 8A depicts $H_{S2}(k)$ as a truncated portion of the master wave model in the frequency domain.

A secondary layer model $h_{S2}(x,t)$ may be constructed by performing a series of transformations on $H_{S2}(k)$. In an exemplary embodiment, process 400 for constructing a subsequent, high-frequency layer model may be used to construct a second layer model. Note, by defining the function $H_{S2}(k)$ over a limited range of n, the set of frequencies has been truncated as illustrated in step 402. Next, a scale factor is applied to $H_{S2}(k)$ in the frequency domain as illustrated in step 404. In some embodiments, $H_{S2}(k)$ is scaled by a factor of two, which shifts the function toward the origin in the frequency domain. Note, after scaling, the wavenumbers that were originally odd will no longer be integers. In some embodiments, non-integer wavenumbers may be discarded.

In some embodiments, the first scale factor is also applied to master wave model parameters such as wave speed and wave height. The first scale factor is applied to these parameters so that the transformed wave function maintains its original properties without becoming distorted. Note that the scale factor is not limited to a factor of two and could be any positive number.

Next, an inverse FFT is applied to the scaled $H_{S2}(k)$ as illustrated in step 406. In some embodiments, an inverse FFT is computed for every other wavenumber value over the range of frequencies associated with the scaled function $H_S(k)$. For example, the inverse FFT may be computed using only the integer wavenumber values. In some embodiments when the first scale factor is 2, odd wavenumber values will become non-integer values and will not be used when computing the inverse FFT of the function $H_S(k)$. In other embodiments, an inverse FFT may be computed on data in which only every $2^x$ wavenumber is present. (e.g., every 2, 4, 8, etc. wavenumbers).

As illustrated in step 408, a second scale factor is applied to the point-sampled function $H_{S2}(k)$ to obtain the fully transformed layer model $h_{S2}(x,t)$. In some embodiments, the second scale factor is a factor of ½, and is applied to $h_{S2}(x,t)$ to restore the original frequencies and wave numbers present in the master wave model. Note that the second scale factor is not limited to a factor of ½ and could be any positive number.

The resulting layer model $h_{S2}(x,t)$ represents a portion of the higher-frequency waves that are present in the master wave model. Because the inverse FFT was performed over a fewer number of wave numbers (n), the transformation exhibits a significant reduction in the computing resources normally required to generate the spatial form. However, because data was lost due to the scaling process, the spatial function $h_{S2}(x,t)$ covers a smaller area than the given area of the original master wave model. To make up for this smaller area, in some embodiments, the function $h_{S2}(x,t)$ may be tiled or repeated over as large of an area as necessary to simulate the full field of the body of water.

If the tiling process is done only on the higher frequency waves, the effects of pattern repetition are disguised in the non-repeating larger waves. As a result, tiling the layer model is barely detectable and does not significantly affect the quality of the final ocean simulation.

In some embodiments, the steps outlined in FIG. 4 may be used to construct additional layers representing other higher-frequency portions of the master wave model. For example, a tertiary layer model may be constructed using wavenumbers from n=$2^{(R-1)}$ through n=$2^R$−1, also referred to as function $H_{S3}(k)$. As described earlier, process 400 for constructing a subsequent, high-frequency layer model may be applied to $H_{S3}(k)$ to obtain a tertiary layer model $h_{S3}(x,t)$. Similarly, the process 400 for constructing a subsequent, high-frequency layer model may be applied to any number of subsequent sets of wavenumbers to obtain any number of subsequent layer models.

Note that each subsequent layer model construction may use different scale factors. For example, a tertiary layer model construction may apply a scale factor of four and a second scale factor of ¼. Constructing multiple subsequent layer models in this way allows even greater wave resolutions without significantly increasing computational burden.

The number of iterations of steps 402 through 410 may depend on the difference between the apparent resolution $R_a$ and computed resolution $R_c$. For example, using Equation 4 to determine the number of layers (L), the process may be iterated (L) number of times. Thus, a set of subsequent layers $h_{S1}(x,t)$, $h_{S2}(x,t)$, $h_{S3}(x,t)$, ... $h_{SL}(x,t)$ may be constructed in order to produce a wave simulation model with the appropriate apparent resolution ($R_a$). In some preferred embodiments, four or more subsequent layers are used to exploit the computational savings of the method.

7. Recombination of Layer Models into Ocean Simulation

Once a primary layer model and the desired number of subsequent layer models are constructed, they may be recombined to form a full-spectrum optimized wave model. In one embodiment, the optimized wave model can be used to generate the wave height field over an area of interest. Typically, the area of interest will be the portion of the ocean or wave simulation visible in a computer-generated scene or computer animation sequence. As such, the area of interest is typically smaller than the given area (206) of the master wave model.

Using the aforementioned property of the Fourier transform in Equation 7, the inverse FFT of portions of a frequency domain function can be combined to produce a spatial domain function h(x,t). Thus, the function h(x,t) will represent the combined spectral features of each individual portion:

$$h(x,t) = \frac{1}{N}\sum H_{P1} e^{-2\pi i k n/N} + \frac{1}{N}\sum H_{S2} e^{-2\pi i k n/N} \ldots + \frac{1}{N}\sum H_{SL} e^{-2\pi i k n/N}. \quad \text{(Equation 9)}$$

The same property of the Fourier transform may be used to construct an optimized wave model $h_O(x,t)$ that represents the full spectrum of the previously constructed layer models:

$$h_O(x,t) = h_{P1}(x,t) + h_{S2}(x,t) + h_{S3}(x,t) \ldots + h_{SL}(x,t). \quad \text{(Equation 10)}$$

Using Equation 10, individual height values h(x,t) may be computed as required over the area of interest. In some embodiments, a complete set of height values over the area may not be explicitly calculated. Instead, the optimized wave model may simply be defined as a combination of the layer models, so that a large number of height values need not be stored in memory. A set of height values or a wave height field may then be computed for an area of interest at the time of rendering the ocean image.

Figure 9:
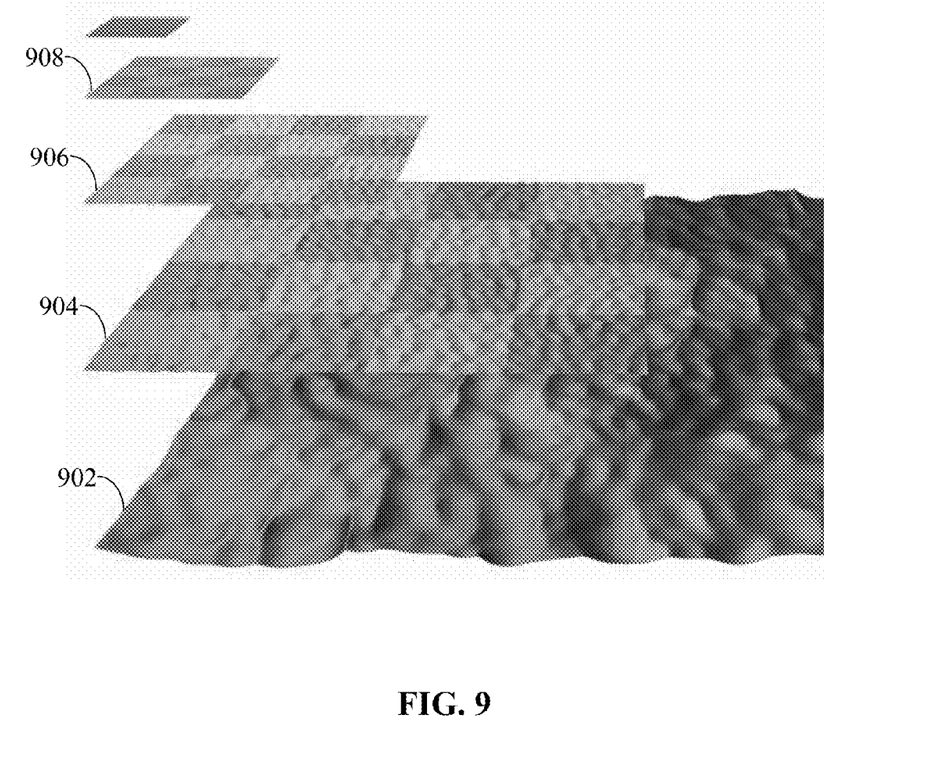
FIG. 9 illustrates an optimized wave model represented by a combination of several layer models.

FIG. 9 depicts a graphical representation of multiple layer models used to define an optimized wave model. In FIG. 9, the layer models are represented as rendered wave surfaces but may also be stored as two-dimensional arrays or bitmaps. In some embodiments, a primary layer model 902 may be defined over an area. As shown in FIG. 9, the primary layer model 902 is defined over the entire area of interest. However, in some embodiments, the primary layer model may be repeated or tiled multiple times to cover a larger area of interest.

FIG. 9 also depicts a secondary subsequent layer model 904, which may represent higher-frequency or smaller wave patterns in the ocean model. Due to the layer construction process outlined in FIG. 4, the secondary subsequent layer model 904 may cover an area that may be smaller than the area of the primary layer model 902. When constructing the optimized wave model, the second subsequent wave model 904 may be repeated or tiled multiple times to cover the entire area of interest. Shaded potions of the secondary subsequent layer model 904 indicate areas in which the layer model is repeated or tiled over the area.

Similarly, a tertiary subsequent layer model 906 and additional subsequent layer model 908 may be used to represent even higher or smaller waves in the ocean model. Pattern repetition or tiling may also be performed such that the layer models are defined over the entire area of interest.

In some embodiments, the subsequent layer models may be tiled over an area smaller than the area of interest. For example, an area of interest may be defined as the area of an ocean surface in the field of view of the camera used to record a three-dimensional scene. If a wide camera angle is used, there may be surface points far off in the distance that will not require the same level of detail as surface points closer to the camera. Thus, the higher-frequency subsequent layer models may not be tiled for portions of the area of interest in which fine detail is not required.

Once an area of interest is determined, Equation 10 allows the computation of a final wave height value as the summation of height values produced from each individual layer model. Typically, an array of height points is computed over the entire area of interest and may be stored as a bitmap of values. The array is not necessarily square or rectangular in shape and may conform to a camera field of view used to visualize a computer animated scene. In some embodiments, the area of interest is calculated based on a camera position with respect to the three-dimensional scene space and may resemble a trapezoidal shape.

Additionally, the density of wave height value points may vary according to a location within the area of interest. For example, the density of points may vary according to the level of detail required to produce a realistic image of the ocean in an animation scene. Portions of the ocean that are closer to the camera may require a more dense array of height values than portions of the ocean that are further from the camera position.

In some embodiments, the number of layers used to define a final height value may vary according to a location within the area of interest. As described earlier, portions of the ocean model that are further from the camera may have too high of a resolution to be visible or may create distortion in the final image in the form of aliasing or image artifacts. Thus, the number of layer models that are combined may vary within the area of interest to produce an ocean simulation that is computationally efficient and adaptable to the visual detail required in the computer animation scene.

Once a wave height field is defined, a triangulation or polygon surfacing method can then be used to define a polygon mesh surface or wireframe model 202 as shown in FIG. 2. Finally, the scene or image may be rendered using one or more graphical shader methods to produce a realistic simulation of an ocean surface. The simulation may be sent to a display device or stored as an image.

8. Computer System

Figure 10:
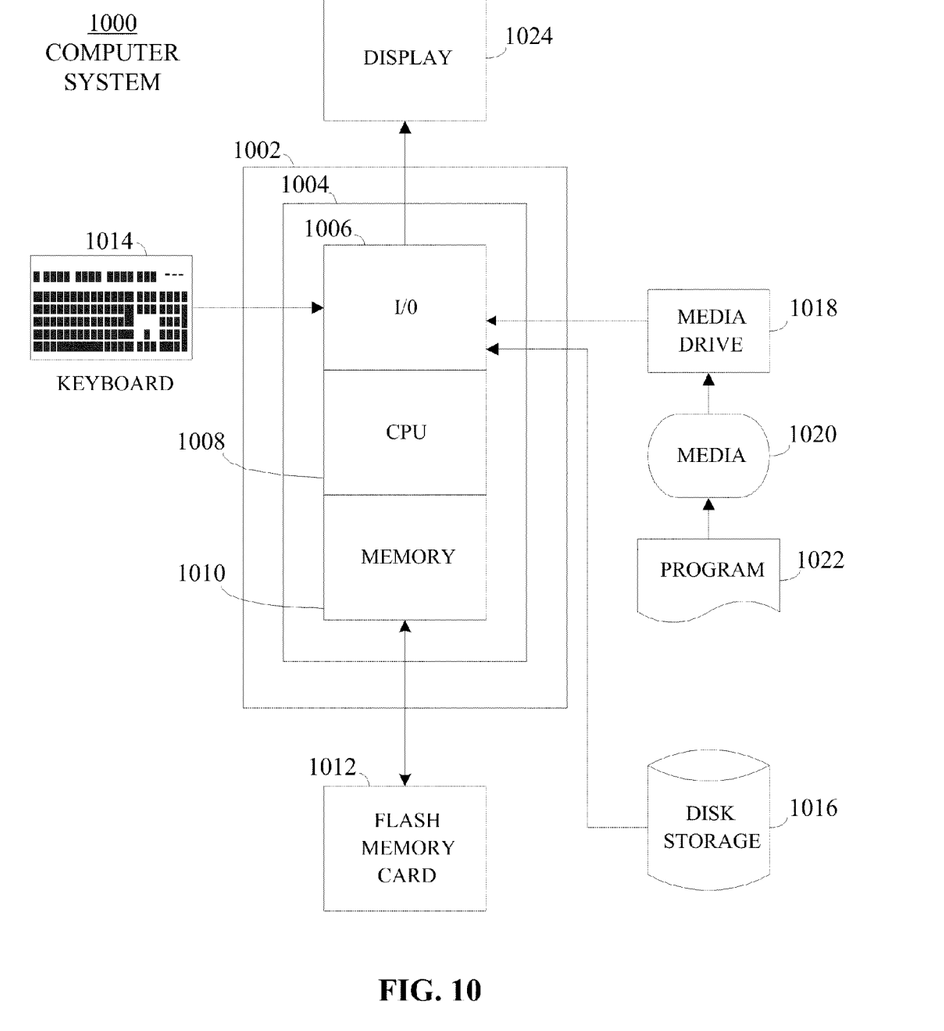
FIG. 10 is a block diagram of an exemplary computer system.

The embodiments described herein are typically implemented in the form of computer software (computer executable instructions) executed on a computer. FIG. 10 depicts an exemplary computer system 1000 configured to perform any one of the above-described processes. In this context, computer system 1000 may be a general-purpose computer including, for example, a processor, memory, storage, and input/output devices (e.g., monitor, keyboard, disk drive, Internet connection, etc.). However, computer system 1000 may include circuitry or other specialized hardware for carrying out some or all aspects of the processes. In some operational settings, computer system 1000 may be configured as a system that includes one or more units, each of which is configured to carry out some aspects of the processes either in software, in hardware or in some combination thereof. For example, in some embodiments, the layer construction processes described in FIG. 3 and FIG. 4 may be computed on parallel computer processors or performed on separate computer systems.

FIG. 10 depicts computer system 1000 with a number of standard components that may be used to perform the above-described processes. The main system 1002 includes a motherboard 1004 having an input/output ("I/O") section 1006, one or more central processing units ("CPU") 1008, and a memory section 1010, which may have a flash memory card 1012 related to it. The I/O section 1006 is connected to a display 1024, a keyboard 1014, a disk storage unit 1016 and a media drive unit 1018. The media drive unit 1018 can read a computer-readable medium 1020, which typically contains programs 1022 and data.

At least some values based on the results of the above-described processes can be saved for subsequent use. For example, the outputs of the system, including the wave height value, can be saved directly in memory (e.g, RAM (Random Access Memory)) or other form of disk storage 1016. Additionally, values derived from the waive height value, such as a set of surface points and a wireframe model, can also be saved directly in memory.

The above-described processes may be used to generate a digital image or animate a body of water in a three-dimensional scene. By rendering a wireframe model, a simulation of the water surface can be visualized as a digital image. The image or animation sequence may be stored in memory 1010, disk storage 1016 or viewed on a computer display 1024.

Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++) or some specialized application-specific language.

Although the invention has been described in considerable detail with reference to certain embodiments thereof, other embodiments are possible as will be understood to those skilled in the art.

I claim:

1. A computer-implemented method for animating the surface of a body of water, the method comprising:
    obtaining a wave model used to describe wave surfaces in a body of water, the wave model comprised of a range of wave model frequencies over a given area;
    defining a primary layer model comprised of a set of primary frequencies, wherein the set of primary frequencies represents a portion of the range of wave frequencies described in the wave model;
    defining a secondary layer model comprised of a set of secondary frequencies, wherein the set of secondary frequencies includes wave frequencies greater than the set of primary frequencies, wherein the set of primary frequencies includes wave frequencies less than the set of secondary frequencies;
    defining a tertiary layer model comprised of a set of tertiary frequencies, wherein the set of tertiary frequencies includes wave frequencies greater than the set of secondary frequencies, wherein the set of secondary frequencies includes wave frequencies less than the set of tertiary frequencies;
    constructing an optimized wave model by combining the primary, secondary, and tertiary layer models;
    determining a wave surface point location within the given area;
    determining a wave height value for the wave surface point location using the optimized wave model; and
    storing the wave height value associated with the wave surface point location.

2. The method of claim 1, wherein defining the secondary layer model comprises:
    applying a first scale factor to the wave model frequencies to define a set of scaled frequencies;
    applying upper and lower limit values to the set of scaled frequencies to define a set of truncated frequencies, wherein the truncated frequencies include frequencies higher than the lower limit value and lower than the higher limit value;
    applying a sampling factor to the set of truncated frequencies to define a set of sampled frequencies, wherein the sampled frequencies include frequencies selected at a rate determined by the sampling factor; and
    applying a second scale factor to the sampled frequencies to define the set of secondary frequencies.

3. The method of claim 1, wherein defining the tertiary layer model comprises:
    applying a first scale factor to the wave model frequencies to define a set of scaled frequencies;
    applying upper and lower limit values to the set of scaled frequencies to define a set of truncated frequencies, wherein the truncated frequencies include frequencies higher than the lower limit value and lower than the higher limit value;
    applying a sampling factor to the set of truncated frequencies to define a set of sampled frequencies, wherein the sampled frequencies include frequencies selected at a rate determined by the sampling factor; and
    applying a second scale factor to the sampled frequencies to define the set of tertiary frequencies.

4. The method of claim 1, wherein the set of secondary frequencies includes some of the same frequencies as the set of primary frequencies.

5. The method of claim 1, wherein the set of tertiary frequencies includes some of the same frequencies as the set of secondary frequencies.

6. The method of claim 1, wherein the secondary layer model is defined over an area different than the given area.

7. The method of claim 1, wherein the tertiary layer model is defined over an area different than the given area.

8. The method of claim 1, wherein constructing the optimized wave model comprises repeating the secondary or tertiary layer model two or more times over the given area.

9. The method of claim 1, wherein constructing the optimized wave model comprises repeating the secondary or tertiary layer model over the entire given area.

10. The method of claim 1, wherein constructing the optimized wave model comprises repeating the secondary or tertiary layer model over an area different than the given area.

11. The method of claim 1, further comprising:
    determining a second wave surface point location within the given area;
    determining a second wave height value for the wave surface point location using the optimized wave model; and
    storing the second wave height value and the first wave height value as part of a wave height field.

12. The method of claim 1, further comprising:
storing the primary layer model, the secondary layer model and tertiary layer model; and
constructing an optimized wave model by combining the previously stored primary, secondary, and tertiary layer models.

13. The method of claim 1, wherein the wave model is obtained by performing a Fourier transformation on a wave surface over the given area.

14. The method claim 1, wherein the wave model contains 512 or more frequencies.

15. The method of claim 1, further comprising:
defining a wireframe model using the wave height value;
rendering a scene including the surface of the body of water using the wireframe model; and
storing the rendered scene.

16. A computer-implemented method for animating the surface of a body of water, the method comprising:
obtaining a wave model used to describe wave surfaces in a body of water, the wave model comprised of a range of wave model frequencies over a given area;
defining a primary layer model comprised of a set of primary frequencies, wherein the set of primary frequencies represents a portion of the range of wave frequencies described in the wave model;
defining a secondary layer model comprised of a set of secondary frequencies, wherein the set of secondary frequencies includes wave frequencies greater than the set of primary frequencies, wherein the set of primary frequencies includes wave frequencies less than the set of secondary frequencies;
defining a tertiary layer model comprised of a set of tertiary frequencies, wherein the set of tertiary frequencies includes wave frequencies greater than the set of secondary frequencies, wherein the set of secondary frequencies includes wave frequencies less than the set of tertiary frequencies;
determining a wave surface point location within the given area;
determining a primary wave height value for the wave surface point location using the primary layer model;
determining a secondary wave height value for the wave surface point location using the secondary layer model;
determining a tertiary wave height value for the wave surface point location using the tertiary layer model;
determining a wave height value for the wave surface point location by combining the primary, secondary and tertiary wave height values; and
storing the wave height value associated with the wave surface point location.

17. A non-transitory computer-readable storage medium comprising computer-executable instructions for animating the surface of a body of water, the instructions comprising:
obtaining a wave model used to describe wave surfaces in a body of water, the wave model comprised of a range of wave model frequencies over a given area;
defining a primary layer model comprised of a set of primary frequencies, wherein the set of primary frequencies represents a portion of the range of wave frequencies described in the wave model;
defining a secondary layer model comprised of a set of secondary frequencies, wherein the set of secondary frequencies includes wave frequencies greater than the set of primary frequencies, wherein the set of primary frequencies includes wave frequencies less than the set of secondary frequencies;
defining a tertiary layer model comprised of a set of tertiary frequencies, wherein the set of tertiary frequencies includes wave frequencies greater than the set of secondary frequencies, wherein the set of secondary frequencies includes wave frequencies less than the set of tertiary frequencies;
constructing an optimized wave model by combining the primary, secondary, and tertiary layer models;
determining a wave surface point location within the given area;
determining a wave height value for the wave surface point location using the optimized wave model; and
storing the wave height value associated with the wave surface point location.

18. The non-transitory computer-readable storage medium of claim 17, wherein the instructions for defining the secondary layer model comprises:
applying a first scale factor to the wave model frequencies to define a set of scaled frequencies;
applying upper and lower limit values to the set of scaled frequencies to define a set of truncated frequencies, wherein the truncated frequencies include frequencies higher than the lower limit value and lower than the higher limit value;
applying a sampling factor to the set of truncated frequencies to define a set of sampled frequencies, wherein the sampled frequencies include frequencies selected at a rate determined by the sampling factor; and
applying a second scale factor to the sampled frequencies to define a set of secondary frequencies.

19. The non-transitory computer-readable storage medium of claim 17, wherein the instructions for defining the tertiary layer model comprises:
applying a first scale factor to the wave model frequencies to define a set of scaled frequencies;
applying upper and lower limit values to the set of scaled frequencies to define a set of truncated frequencies, wherein the truncated frequencies include frequencies higher than the lower limit value and lower than the higher limit value;
applying a sampling factor to the set of truncated frequencies to define a set of sampled frequencies, wherein the sampled frequencies include frequencies selected at a rate determined by the sampling factor; and
applying a second scale factor to the sampled frequencies to define a set of secondary frequencies.

20. The non-transitory computer-readable storage medium of claim 17, wherein the set of secondary frequencies includes some of the same frequencies as the set of primary frequencies.

21. The non-transitory computer-readable storage medium of claim 17, wherein the set of tertiary frequencies includes some of the same frequencies as the set of secondary frequencies.

22. The non-transitory computer-readable storage medium of claim 17, wherein the secondary layer model is defined over an area different than the given area.

23. The non-transitory computer-readable storage medium of claim 17, wherein the tertiary layer model is defined over an area different than the given area.

24. The non-transitory computer-readable storage medium of claim 17, wherein the instructions for constructing the optimized wave model comprises repeating the secondary or tertiary layer model two or more times over the given area.

25. The non-transitory computer-readable storage medium of claim 17, wherein the instructions for constructing the optimized wave model comprises repeating the secondary or tertiary layer model over the entire given area.

26. The non-transitory computer-readable storage medium of claim 17, wherein the instructions for constructing the optimized wave model comprises repeating the secondary or tertiary layer model over an area different than the given area.

27. The non-transitory computer-readable storage medium of claim 17, further comprising instructions for:
storing the primary layer model, the secondary layer model and tertiary layer model; and
constructing an optimized wave model by combining the previously stored primary, secondary, and tertiary layer models.

28. A non-transitory computer-readable storage medium comprising computer-executable instructions configured to animate the surface of a body of water, the instructions comprising:
obtaining a wave model used to describe wave surfaces in a body of water, the wave model comprised of a range of wave model frequencies over a given area;
defining a primary layer model comprised of a set of primary frequencies, wherein the set of primary frequencies represents a portion of the range of wave frequencies described in the wave model;
defining a secondary layer model comprised of a set of secondary frequencies, wherein the set of secondary frequencies includes wave frequencies greater than the set of primary frequencies, wherein the set of primary frequencies includes wave frequencies less than the set of secondary frequencies;
defining a tertiary layer model comprised of a set of tertiary frequencies, wherein the set of tertiary frequencies includes wave frequencies greater than the set of secondary frequencies, wherein the set of secondary frequencies includes wave frequencies less than the set of tertiary frequencies;
determining a wave surface point location within the given area;
determining a primary wave height value for the wave surface point location using the primary layer model;
determining a secondary wave height value for the wave surface point location using the secondary layer model;
determining a tertiary wave height value for the wave surface point location using the tertiary layer model;
determining a wave height value for the wave surface point location by combining the primary, secondary and tertiary wave height values; and
storing the wave height value associated with the wave surface point location.

29. A system for animating the surface of a body of water, the method comprising:
a memory configured to store a wave height value; and
a non-transitory computer-readable storage medium having computer-executable instructions for:
obtaining a wave model used to describe wave surfaces in a body of water, the wave model comprised of a range of wave model frequencies over a given area;
defining a primary layer model comprised of a set of primary frequencies, wherein the set of primary frequencies represents a portion of the range of wave frequencies described in the wave model;
defining a secondary layer model comprised of a set of secondary frequencies, wherein the set of secondary frequencies includes wave frequencies greater than the set of primary frequencies, wherein the set of primary frequencies includes wave frequencies less than the set of secondary frequencies;
defining a tertiary layer model comprised of a set of tertiary frequencies, wherein the set of tertiary frequencies includes wave frequencies greater than the set of secondary frequencies, wherein the set of secondary frequencies includes wave frequencies less than the set of tertiary frequencies;
constructing an optimized wave model by combining the primary, secondary, and tertiary layer models;
determining a wave surface point location within the given area;
determining a wave height value for the wave surface point location using the optimized wave model; and
storing the wave height value associated with the surface point location.

* * * * *